(12) United States Patent
Pellenc (10) Patent No.: US 9,078,387 B2
(45) Date of Patent: Jul. 14, 2015

(54) HAND-HELD POWERED SOIL CULTIVATION DEVICE

(75) Inventor: Roger Pellenc, Pertuis (FR)

(73) Assignee: PELLENC (SOCIETE ANONYME), Pertuis (FR)

( * ) Notice: Subject to any disclaimer, the term of this patent is extended or adjusted under 35 U.S.C. 154(b) by 0 days.

(21) Appl. No.: 13/642,198

(22) PCT Filed: Apr. 20, 2011

(86) PCT No.: PCT/FR2011/050909
§ 371 (c)(1),
(2), (4) Date: Dec. 17, 2012

(87) PCT Pub. No.: WO2011/131909
PCT Pub. Date: Oct. 27, 2011

(65) Prior Publication Data
US 2013/0098644 A1   Apr. 25, 2013

(30) Foreign Application Priority Data

Apr. 21, 2010   (FR) ...................................... 10 53027

(51) Int. Cl.
*A01B 1/06* (2006.01)
(52) U.S. Cl.
CPC ...................................... *A01B 1/065* (2013.01)
(58) Field of Classification Search
USPC ........ 172/40, 41, 42, 54, 54.5, 84–89, 92–95, 172/97, 110, 111, 371
See application file for complete search history.

(56) References Cited

U.S. PATENT DOCUMENTS

| | | | | | |
|---|---|---|---|---|---|
| 1,827,074 | A | * | 10/1931 | Ditlevsen | 172/41 |
| 2,550,522 | A | * | 4/1951 | Bolongaro | 172/40 |
| 2,553,463 | A | * | 5/1951 | McCulloch | 74/502.4 |
| 2,641,982 | A | * | 6/1953 | Harshberger | 172/40 |
| 2,792,769 | A | * | 5/1957 | Harshberger | 172/40 |
| 2,817,205 | A | * | 12/1957 | Muller | 56/10.1 |

(Continued)

FOREIGN PATENT DOCUMENTS

| | | |
|---|---|---|
| DE | 10 2007 034908 | 2/2009 |
| FR | 2394971 | 1/1979 |

(Continued)

OTHER PUBLICATIONS

International Search Report dated Aug. 10, 2011, corresponding to PCT/FR2011/050909.

*Primary Examiner* — Matthew D Troutman
(74) *Attorney, Agent, or Firm* — Young & Thompson (57) ABSTRACT

A hand-held powered ground and soil cultivation device includes a handle, a first end of which includes a holding zone and/or a holding member for the user, and the opposite end of which includes a head to which a working tool is rotationally or pivotally attached. During operation of the device, the working tool performs a reciprocating oscillating movement along a portion of a rotation and about a predetermined central angular position under the effect of the movement transmitted by a drive unit including at least an electric actuator or a heat engine. The hand-held powered device is characterized in that the working tool is releasably attached to the head, the working tool being mounted on a drive shaft that performs a reciprocating oscillating rotational movement and forms a vertical or horizontal axis of oscillation for the tool. The central angular position of the working tool can be adjusted.

25 Claims, 11 Drawing Sheets

(56) References Cited

U.S. PATENT DOCUMENTS

| | | | |
|---|---|---|---|
| 3,057,412 A * | 10/1962 | Hovis, Jr. | 172/42 |
| 3,204,704 A * | 9/1965 | Goette | 172/41 |
| 3,406,761 A * | 10/1968 | Ryan | 172/42 |
| 3,508,616 A * | 4/1970 | Hubbard | 172/40 |
| 3,935,905 A * | 2/1976 | Chery | 172/40 |
| 3,965,991 A | 6/1976 | Eads | |
| 4,093,031 A | 6/1978 | Portz | |
| 4,122,902 A * | 10/1978 | Alexander | 172/41 |
| 4,305,470 A | 12/1981 | Anderson | |
| 4,351,396 A | 9/1982 | Moulton | |
| 4,353,422 A * | 10/1982 | Bennett, Jr. | 172/41 |
| 4,452,316 A * | 6/1984 | Edwards | 172/41 |
| 4,541,492 A * | 9/1985 | Motruk | 172/41 |
| 4,558,745 A * | 12/1985 | Ley | 172/42 |
| 4,648,464 A * | 3/1987 | Huxley | 172/36 |
| RE33,238 E * | 6/1990 | Moulton et al. | 172/40 |
| 5,441,116 A * | 8/1995 | Rodriguez | 172/101 |
| 5,697,453 A * | 12/1997 | Van Den Bosch | 172/41 |
| 6,904,976 B1 * | 6/2005 | Zach et al. | 172/41 |
| 2007/0193754 A1 * | 8/2007 | Beckman et al. | 172/41 |
| 2011/0177373 A1 | 7/2011 | Pellenc | |
| 2012/0118595 A1 | 5/2012 | Pellenc | |

FOREIGN PATENT DOCUMENTS

| | | |
|---|---|---|
| FR | 2 530 917 | 2/1984 |
| FR | 2541849 | 9/1984 |
| FR | 2546706 | 12/1984 |
| FR | 2920683 | 3/2009 |
| FR | 2920913 | 3/2009 |

* cited by examiner

HAND-HELD POWERED SOIL CULTIVATION DEVICE

This invention relates to the field of soil cultivation tools, particularly for cultivating gardens and grounds, and in particular that of the devices of handheld tools, equipped with their own source of electric power, and operated directly by the user. The invention encompasses more specifically a handheld motor-driven soil cultivation tool device, more particularly of the electric hoeing tool type.

BACKGROUND OF THE INVENTION

Numerous variant embodiments of tools of this type are already known, with entirely manually-operated handling or with motor-driven assistance.

These tools have diverse shapes, in particular at the end that works the soil, as a function of the nature of the work to be performed and optionally of the nature of the soil and the plant cover.

As far as the manually-operated (non-motorized) tools are concerned:

U.S. Pat. No. 3,965,991 discloses a hoe equipped with an elongated handle, at the end of which is placed a cutting tool, with the ability to rotate around an axis perpendicular to said handle. The latter exhibits a sharpened blade along each of its major lengths, bent in the shape of a U, and inserted by its ends into the two free ends of a flattened tube, itself also bent in U-shape, the core of the latter being integral with the handle.

FR-A-2 394 971 discloses a hoe with a construction similar to the one described above. The cutting tool, itself also slightly mobile in rotation, consists of a blade bent in the shape of a U, but whose wings are bent at their end in a way that is parallel to the base of the U. It is at these two ends that the blade is then taken between two metal plates that are secured to the handle of the device.

Nevertheless, these hand-operated devices exhibit numerous drawbacks. The first is common to all hoeing or similar tools with manually-operated handling and consists in tedious handling and in quick tiring of the user. In addition, the latter is forced, particularly for ergonomic reasons, to change the tool as soon as he wants to change operations: uproot weeds, aerate the soil, break up clumps of earth, cut edges, etc. It is therefore necessary for him to carry entirely different tools.

So far as motor-driven or power-assisted tools are concerned:

U.S. Pat. No. 4,305,470 discloses an electric hoeing tool whose motor is located at the high end of the handle located opposite the cutting tool. The motor drives a shaft in rotation in the handle, which, thanks to two successive eccentric gears, creates a reciprocating rotational movement of the cutting tool. Nevertheless, by the nature of its mounting, the maintenance and eventual replacement of the blade are tedious and not very user-friendly operations. Moreover, the placement of the motor does not make it possible to use the weight of the latter advantageously, in particular to improve the penetration of the blade into the soil. Furthermore, no adjustment of the movement or of the position of the blade is provided.

FR-A-2 530 917 discloses an electric hoeing tool whose motor is located at the same end of the handle as the cutting tool (lower end), which makes it possible to take advantage of its weight. However, with this configuration, as with the one described in U.S. Pat. No. 4,305,470, the two-part cutting tool must be attached on both sides of the head, which necessitates access on both sides and thus creates a large number of possible openings for dust, speeding up the fouling of the motor, as well as moving parts or bearings susceptible to breaking. Moreover, stones are frequently found wedged between the two parts of the tool during use, forcing the work underway to stop.

These two known designs of motor-driven tools also share the major drawback of not making it possible to adjust, in relation to the handle, the middle position of the cutting tool in relation to which it performs its back-and-forth movement, while it has been found that this middle position is one of the essential parameters that determine the comfort of use and the effectiveness of the soil cultivation devices. Now, the gripping height of the device as well as the slope of the soil being worked prevent guaranteeing that this middle position is systematically ideal.

Furthermore, the document FR-A-2 546 706 discloses two different types of motor-driven soil cultivation devices that can be mounted on the same handle through which a drive shaft passes.

The first type of device (shown in FIGS. 1 to 4 of this document) comprises two tools in the shape of spades mounted on both sides of a transfer gear housing. These two spades are driven with elliptical movements that are 180° out of phase, by connecting rod/crank mechanisms and while being guided in translation in a bearing mounted articulated on a directional support arm.

Thus, this first type of device, besides a construction and a mechanism for transforming complex movements, comprises several out-of-phase tools driven with continuous rotational movements. Furthermore, the drive pin of the spades and their pivot pin are separate and offset.

The second type of device disclosed by the document FR-A-2 546 706 (shown in FIGS. 5 to 7) comprises several tools driven with a continuous rotational movement.

Finally, the document DE-A-10 2007 034 908 has as its object a motor-driven hoe or pick mounted on wheels. This device comprises a rotating motor driving a complex mechanism for transforming movement at two outputs, which displaces the tools that are attached at the end of slides in cyclical elliptical movements 180° out of phase.

Moreover, none of the tools of these two latter documents performs a hoeing work.

SUMMARY OF THE INVENTION

This invention, in particular, aims to overcome the drawbacks of the solutions that are known and mentioned above, by proposing a handheld motor-driven soil cultivation device, such as a hoeing tool or a claw in particular, of simple construction, in particular for the transmission of movement, and whose tool is easily interchangeable and in operation performs a hoeing action. Furthermore, this device will have to allow for the user an ergonomic adaptation to the type of work to be performed and/or to the nature or configuration of the soil.

Furthermore, the tool should be attached simply by a minimum number of attachment points, in particular, in case of need, by a single point.

For this purpose, the invention has as its object a handheld motor-driven soil and ground cultivation device, such as a hoeing tool, weeding hoe, claw or the like, comprising, on the one hand, a handle that comprises, at a first end, a gripping zone and/or at least a gripping element for the user, and, at the opposite end, a head to which a work tool is attached, by a rotary or pivoting link, which, when the device is used, is driven with a reciprocating oscillating movement along a portion of rotation and around a specified middle angular position under the action of the movement transmitted by a drive device comprising at least one electric actuator or a heat engine, a handheld motor-driven device characterized in that the work tool is connected to the head in a removable way, while being mounted on a drive shaft driven with a reciprocating oscillating rotating movement and forming a vertical or horizontal axis of oscillation for the tool and in that the middle angular position of said work tool is adjustable.

BRIEF DESCRIPTION OF THE DRAWINGS

The invention will be better understood, thanks to the description below, which relates to preferred embodiments, given by way of nonlimiting examples, and explained with reference to the accompanying diagrammatic drawings, in which.

DETAILED DESCRIPTION OF THE PREFERRED EMBODIMENTS

Figure 1:
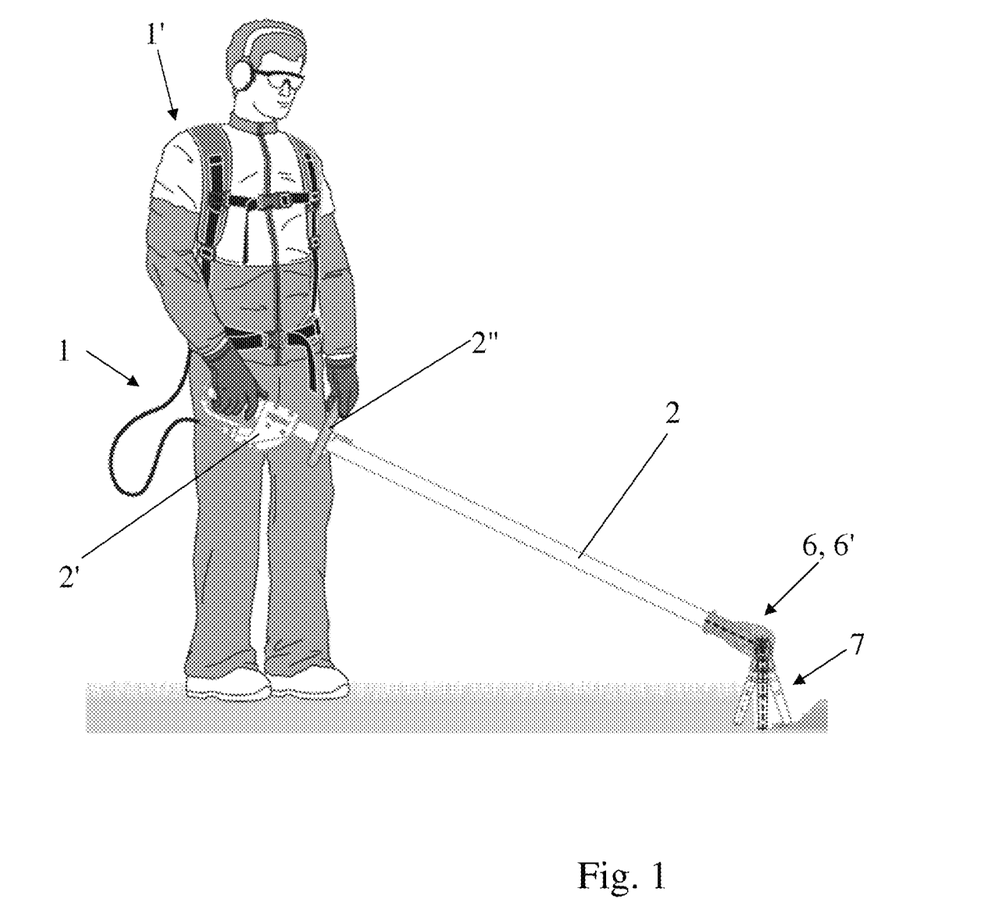
FIG. 1 is a side view, showing the handheld motor-driven device according to a first embodiment of the invention during use.
Figure 2A:
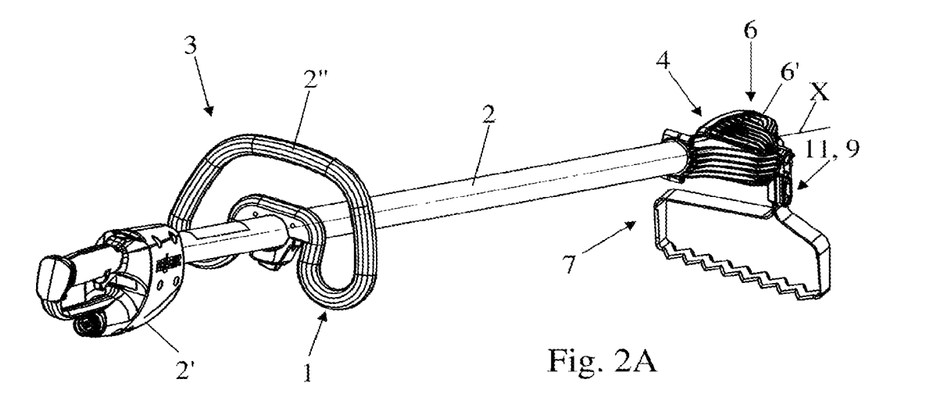
FIGS. 2A and 2B are perspective views in two different directions of the device shown in FIG. 1, the battery and the supply cord being removed.
Figure 2B:
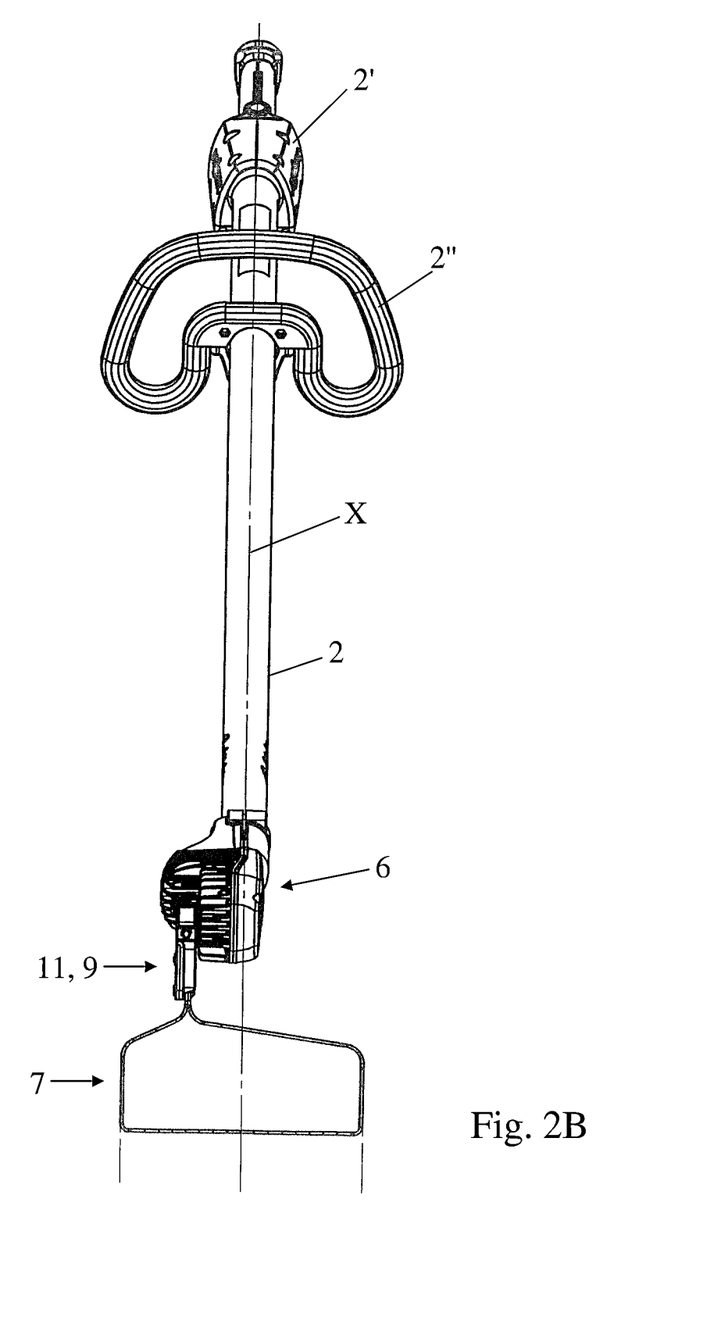
Figure 3:
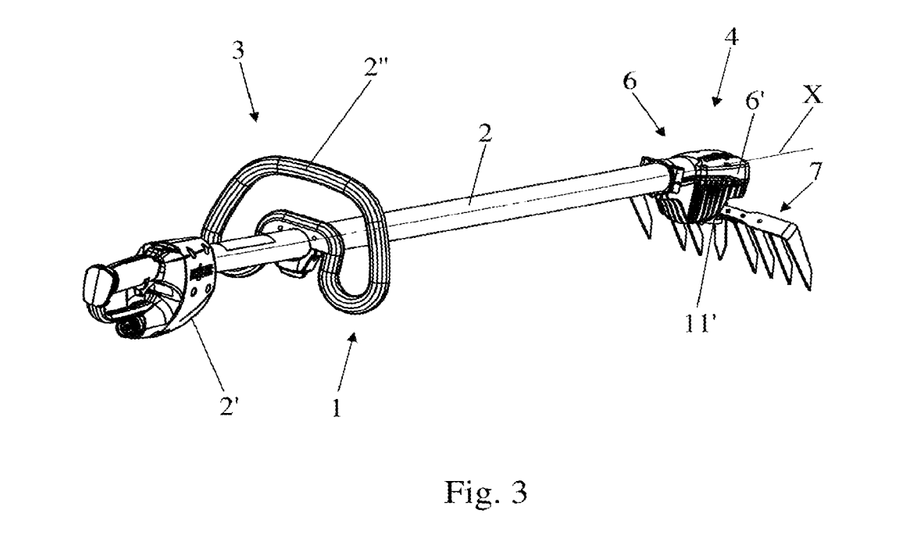
FIG. 3 is a perspective view of the device shown in FIG. 2, equipped with a different work tool, the head being rotated 90° around the axis of the handle in comparison with FIG. 2.

FIGS. 1 to 3 of the accompanying drawings show a handheld motor-driven device 1 for working the ground and the soil, such as a hoeing tool, weeding hoe, claw or the like.

This device 1 comprises, on the one hand, a handle 2 that has, at a first end 3, a gripping zone and/or at least one gripping element for the user, and, at the opposite end 4, a head 6 to which is attached, by a rotary or pivoting link, a work tool 7 that, when said device 1 is used, is driven by a reciprocating oscillating movement along a portion of rotation and around a specified middle angular position, under the action of the movement transmitted by a drive device 5, 5' comprising at least one electric actuator or a heat engine.

According to the invention, the work tool 7 is connected to the head 6 in a removable way, while being mounted on a drive shaft 8 driven with a reciprocating oscillating rotating movement and forming a vertical or horizontal oscillation axis for the tool 7, and the middle angular position of said work tool 7 is adjustable.

Thus, the device 1 can be equipped with several different work tools, and the latter can be adjusted, in terms of work position, to adapt the device 1 to the user for the purpose of optimized handling.

Moreover, because of the fastening of the tool directly on the drive shaft 8, the mechanism for transmitting the movement is simplified as much as possible with limiting of power losses due to friction and to conversions of movement. Furthermore, any susceptible part is freed from being subject to wear by the transmission of the movement of the tool.

The dual function of fastening support and drive element of the shaft 8 in relation to the tool 7 requires a rigid and strong mounting of the latter in the head 6.

Also, its function of pivoting axis for the tool 7, during its reciprocating movement that makes it possible to obtain a ground working action similar to a hoeing, determines its orientation, normally perpendicular to the longitudinal axis of the handle 2.

Finally, the absence of a complex mechanism for transmitting and converting the movement also makes it possible to have a simpler, more reliable and less hazardous device.

To simplify the design of the device 1 and to make the assembly and disassembly of the tool 7 as easy as possible, it can be advantageously provided that the latter is connected to the head 6 by a single fastening point, while being mounted laterally or on one side of said head 6.

The fastening method and the shape of the tool are designed in such a way that said tool 7 is positioned symmetrically in relation to the longitudinal axis X of the handle 2, after mounting and fastening on the head 6 (FIG. 2B).

These arrangements make it possible easily to interchange the work tools 7, to use tools 7 of different widths, in particular with widths clearly greater than the head 6, and to position the tool 7 in relation to the handle 2 so as to have maximum comfort of use for the operator.

As FIGS. 1 to 3 also show, the handle 2 is advantageously provided with a handle 2' at its end 3 opposite the head 6, this handle 2' incorporating an electronic card for control of the electric actuator 5, connected to elements for control and selection of speeds.

Thus, the operator or the user can adapt the operation of the device 1 according to the work tool used, the nature and the consistency of the soil, and, more generally, the factor to be favored (comfort, effectiveness, speed).

The handle 2 can also comprise an additional handle 2" for holding the device 1 during use, optionally fastened on the handle 2 with the insertion of vibration damping means (foam, washers or cylinders made of rubber or the like).

In conformity with a characteristic of the invention, making it possible to increase the polyvalence of the device 1 in terms of conditions of use and of work that can be performed, and to enlarge the range of work tools 7 that can be used, the head 6 is preferentially attached to the handle 2 by a fastening means that allows a mounting with locking in position of said head 6 in at least two angular positions that are mutually offset around the longitudinal axis of said handle 2, for example about 90°.

Thus, as it comes out from a comparison of FIGS. 2 and 3, it is possible to use tools 7 that oscillate either around a vertical axis (FIG. 3), or around a horizontal axis (FIG. 2). The same tool 7 can optionally be used in the two orientations as a function of the work to be done.

Although the drive device 5, 5' can be mounted at any position on the handle 2 (at a middle portion or at the level of the handle 2'), it is advantageously provided according to the invention that the drive device (comprising an electric actuator 5 or a heat engine) is incorporated into the head 6, this device also comprising, if needed, a system 5' for transmitting and optionally for conversion of movement, associated with said actuator or engine.

One of the advantages of placing the drive device 5 at the level of the second end 4 of the handle 2 is that the weight of this device facilitates penetrating and keeping the tool 7 in the worked soil. Thus, it will not be necessary for the user to bear down excessively on the motor-driven tool device 1 so as to guarantee a deep penetration of the tool 7.

Figure 4A:
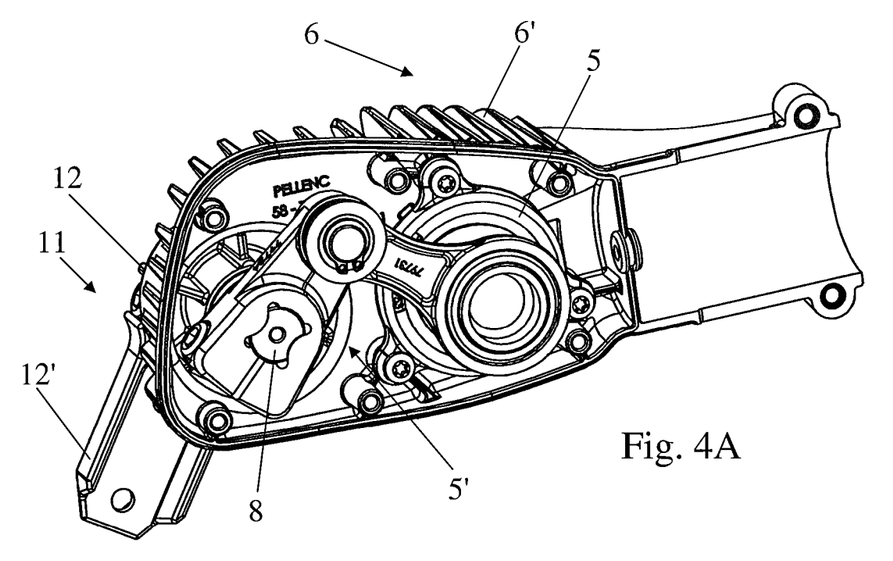
FIGS. 4A and 4B are views in perspective of the head of the device according to the invention, partially open.
Figure 4B:
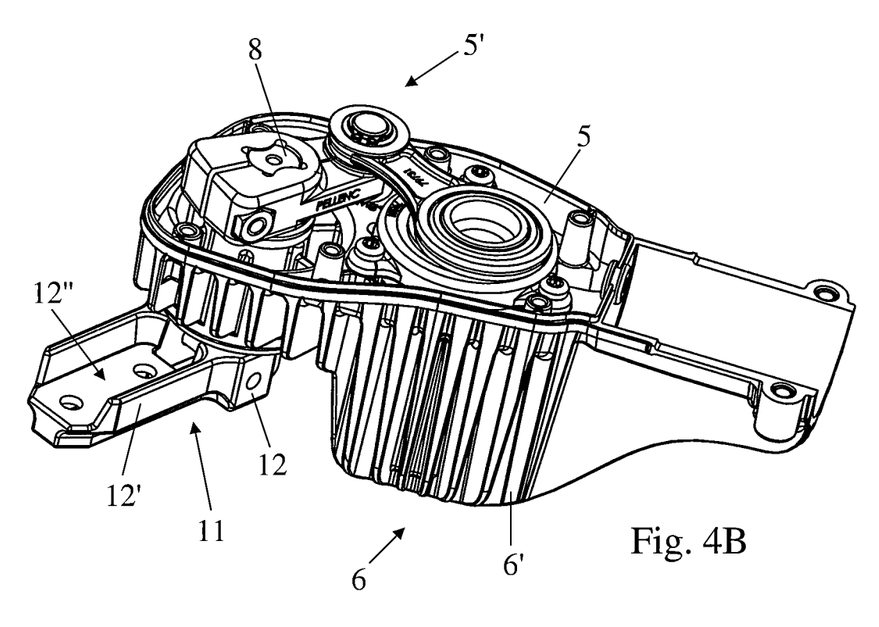

The head 6 preferentially comprises, as FIGS. 4A and 4B show in more detail (in connection with FIGS. 2 and 3), a housing 6' containing the drive device, which is, for example, made of two metal half-shells assembled in a weatherproof manner, and which is extended by a connection sleeve intended to be fastened on the end 4 of the handle 2 (optionally with possibility of orientation). The housing 6' exhibits a sufficiently rigid and strong construction to transmit the stresses and forces between the handle 2 and the tool 7 (optionally with the presence of stiffening and cooling fins).

In conformity with a preferred constructive variant of the invention, which is evident from FIGS. 4 to 7 and 9 of the drawings, and partially from FIGS. 2 and 3, the work tool 7 is mounted on a projecting part 8' of a shaft 8, coming outside of the housing of the head 6 and preferentially oriented approximately at a right angle in relation to the longitudinal axis X of the handle 2, this mounting of the work tool 7 being achieved by means of an intermediate part 11 for connection, for support and for maintenance that is rigidly attached and with a radial extension to said shaft 8 or by means of a connection part 11' with a connection site that is adapted and is part of the work tool 7 or associated with the latter.

These arrangements make it possible to facilitate the assembly and the disassembly of the tool 7, for cleaning, maintenance and replacement, or else to avoid the risks of injuries when the device 1 is not in use. The shaft 8 comes out of the housing 6' of the head 6 that contains it advantageously by only one end, but optionally also by each of its ends. If the shaft 8 comes out by its two ends, the tool 7 will be able to be fastened to one or the other of the ends of the shaft 8, as desired by the user (right-handed or left-handed) or as a function of the work to be done.

The mounting of a work tool 7 having two fastening points can then also be envisaged.

The shaft 8 is mounted to rotate in at least one corresponding bearing that is part of the head 6, preferentially a weatherproof bearing set in the housing 6' and that closes the latter at the level of the external projecting part 8' of said shaft 8.

As mentioned previously, the drive device can comprise an electric actuator or a heat engine that drives, with or without reduction gearing, the shaft 8, after conversion of the continuous movement into reciprocating movement.

Although a reciprocating linear electric actuator can be envisaged, it is proposed, within the scope of the invention, that the electric actuator 5 preferentially be a rotating electric motor (for example, a brushless motor).

The drive device can then consist of an actuator 5 of the rotating motor type, associated with a high ratio reduction gear (for example between 15 and 50, advantageously on the order of 20 to 30) and a system 5' for transmitting and converting movement, for example of the connecting rod/crank type, so as to drive the shaft 8 in a reciprocating oscillating rotational movement.

However, as a variant, it can also be envisaged that the drive device consists of an electric motor 5 whose continuous rotational movement is directly converted, by a system 5' for converting movement that drives the shaft 8, in a reciprocating oscillating rotational movement.

Such a movement conversion mechanism is known in itself and variants are disclosed, for example, in the cited documents, and therefore its practical embodiment falls within the competence of the professional knowledge of a person skilled in the art.

As a variant, the system 5' could optionally consist of, on the one hand, a fork or an oblong opening provided at the level of the tool 7, and, on the other hand, an eccentric pin located on a shaft that has a continuous rotation and that circulates in the fork that it drives in a pendular movement.

To give total freedom of movement to the user and to allow use of the device 1 in any location, the electric actuator 5 is advantageously supplied by an independent power source 1', designed to be carried by the user and that is part of the handheld motor-driven device 1.

To have sufficient independence, the independent power source 1' consists of a rechargeable electric battery of the Li-Ion or Li-Polymer type, preferentially carried by the user by means of a harness. The battery 1' can, for example, be of the type mentioned in the documents FR 2 920 683 and FR 2 920 913 or not of the applicant.

To allow the user to adjust the device 1 for a maximum comfort of usage, in particular a use with minimized effort, the work tool 7 is attached, with several possible middle angular positions, to the part 8' of the shaft 8 coming outside the head 6, and is able to be fastened in an indexed position, located within a range of angular positions, around said shaft 8 and defining the middle angular position.

The inventors have been able to find, in an unexpected and surprising way, that the range of angular positions comprises corresponding indexed positions, for at least one type of tool 7 that is specified and for a given user, and therefore for a given inclination of the handle 2 in relation to the ground, at middle angular positions such that the work tool 7 exhibits a more or less considerable movement of advance or of independent and automatic progress, associated with a more or less deep and inversely proportional penetration of the work tool 7 into the soil.

According to a first embodiment of the invention, adapted more particularly to tools 7 that oscillate around a horizontal axis in use and shown particularly in FIGS. 1, 2 and 4 to 7, the work tool 7 comprises a single fastening bracket 9, which is intended to be rigidly attached to the intermediate part 11, preferentially by engaging in it with the cooperation of additional shapes.

This bracket 9 is positioned in such a way that the tool 7 is advantageously approximately centered in relation to the X axis of the handle 2 (FIG. 2B).

Figure 5:
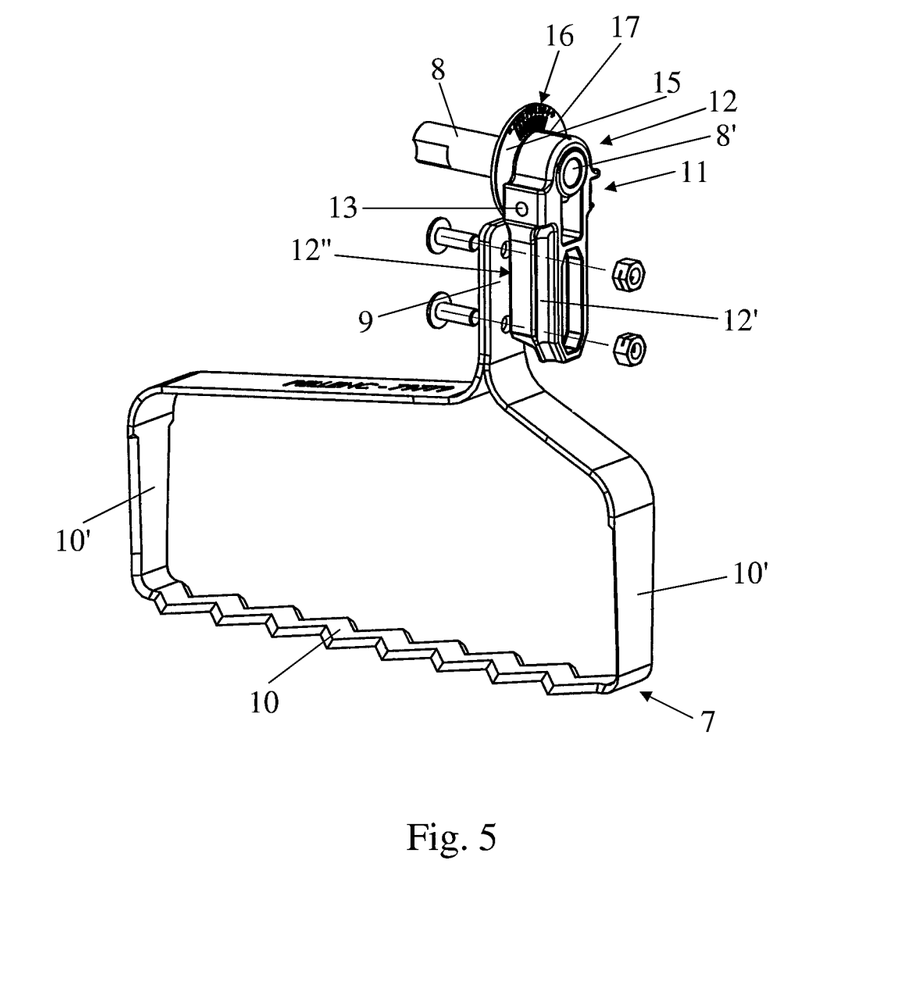
FIG. 5 is a partially exploded perspective view, showing the mounting of the work tool of the device of FIG. 1.
Figure 6:
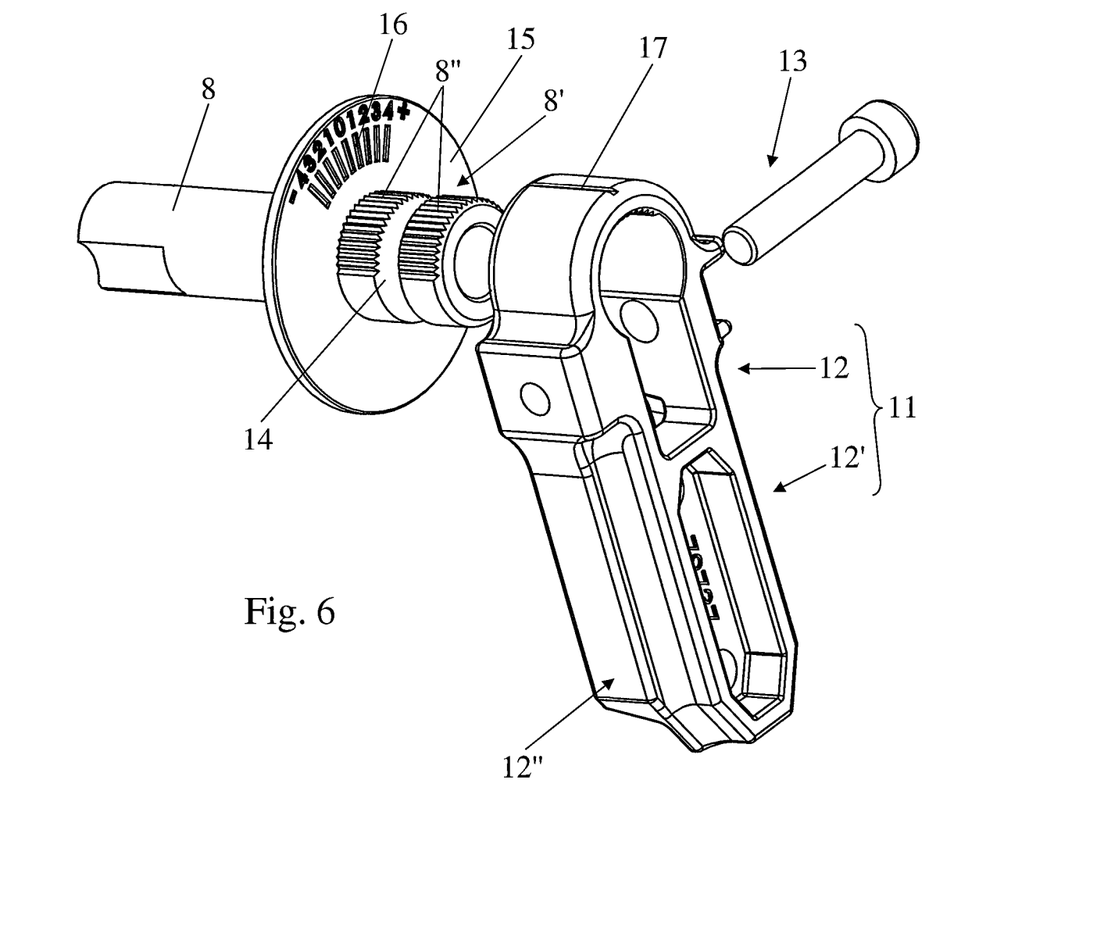
FIG. 6 is an exploded perspective view, showing in a different scale the mounting of the intermediate part on the shaft of the head in conformity with FIG. 5.
Figure 7:
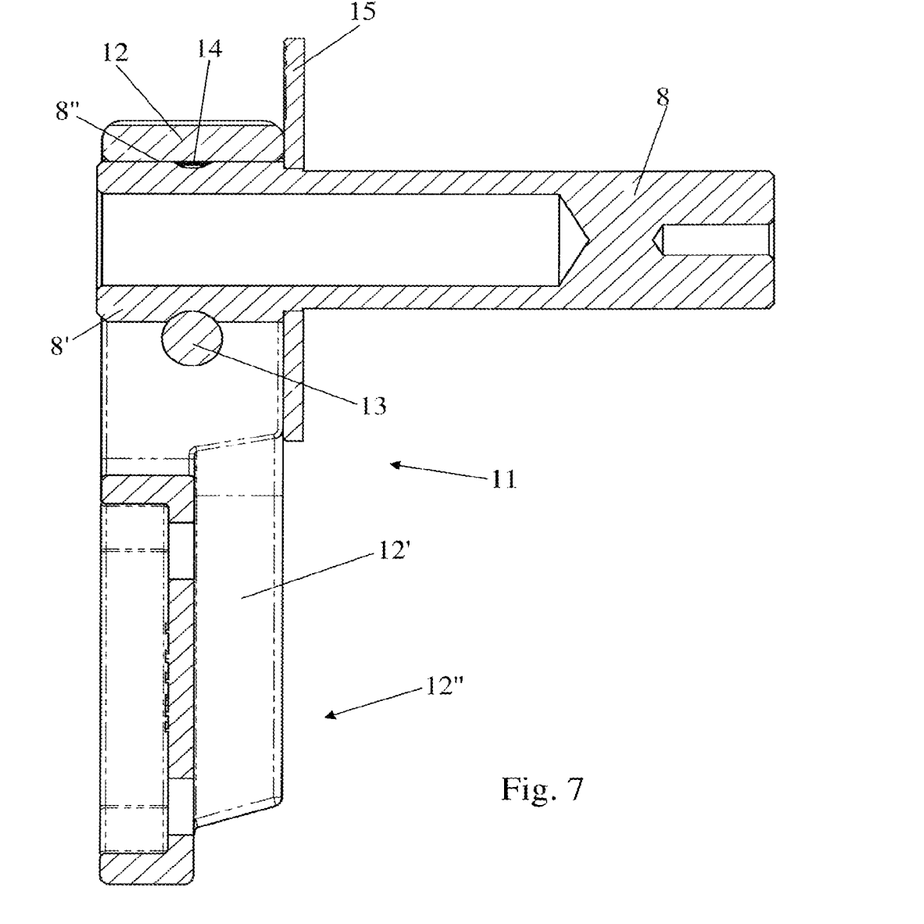
FIG. 7 is a side cutaway view of the mounting of the intermediate part on the shaft of the head, as shown in FIG. 5, and, FIG. 8 is a perspective view of another variant embodiment of the work tool that is part of the device according to the invention, which can be mounted instead of the work tool shown in FIGS. 1, 2 and 5.

As FIGS. 5 to 7 of the drawings show more precisely, the body of the intermediate part 11 comprises essentially two parts 12 and 12' all in one piece, namely, on the one hand, a first U-shaped part 12 incorporating an open ring with inside notching or toothing, designed to engage with a complementary notching or a toothing 8" present on the projecting part 8' of the shaft 8 and, on the other hand, a second part 12' forming a fastening plate for the bracket 9 of the work tool 7.

To guarantee a securing in rotation without play and with great rigidity between the shaft 8 and the tool 7, allowing the transmission of a considerable torque, all while making possible an easy assembly, disassembly and adjustment, the intermediate part 11 is secured to the projecting part 8' of the shaft 8 by a screw, pin or the like 13 going through the branches of the U extending the open ring of the first part 12 and engaging in a circular groove 14 made on the projecting part 8' of the shaft 8, and the second part 12' forming a plate exhibits an indentation 12" intended to receive the bracket 9 of the work tool 7 in a clamped way, the engagement with fitting of said bracket 9 in said indentation 12" being locked, for example, by at least two screws or the like.

The stresses resulting from the torque are, consequently, transmitted between the part 11 and the tool 7 essentially by this engagement by fitting, and not by the locking screws.

As FIG. 5 shows in particular, the fitting 9/12" is carried out over a relatively great length so as to distribute the stresses.

To make it possible for the user to adjust in a controlled way the position of the tool 7 in relation to the handle 2, it can be provided that the projecting part 8' of the shaft 8 be equipped with a plate or with a dial 15 having an angular graduation 16, and that the intermediate part 11 or the work tool 7 be provided with an indexing mark 17, located face-to-face with said angular graduation 16 in mounted position of said intermediate part 11, with or without the tool 7 (FIGS. 5 and 6).

It should be noted, in connection with the embodiment of FIGS. 1, 2 and 4 to 7, that only a guided movement of rotation around an axis approximately parallel to the ground being worked and perpendicular to the handle 2 is possible for the tool 7. During at least a part of its back-and-forth movement, the tool 7 is in the soil, and can therefore aerate the ground, cut the roots of the weeds, etc. The adjustment of the position of the tool 7, made before the starting of the machine, therefore defines the middle position around which the back-and-forth movement of this tool will be made.

In a preferred way, the middle angular position of the work tool 7 is adjusted in such a way that in a position of normal use, said tool 7 makes an approximately symmetrical pendular movement around the vertical in relation to the soil.

The pendular travel of the tool 7 is also selected from a range of travel representing a portion of rotation, for example for a range of movement of between about 15° and about 40°, preferentially with a range of about 20° to 30°.

According to the invention, it is therefore possible to choose the fastening of the tool 7 and to guarantee that the middle position always corresponds to the ideal configuration, regardless of the size of the user, the vertical gap between the work plane and the plane in which the user is found, or else the difference in slope between the soil being worked and the soil on which the user is standing. This adjustment therefore makes it possible to guarantee that the middle position of the tool 7 is at least approximately in a plane that is perpendicular to the soil being worked, regardless of the angle of the handle 2 in relation to this soil, in a work situation.

However, it is also possible to benefit from this possibility of adjustment by intentionally fastening the work tool 7 in such a way that its middle position is not in a plane that is perpendicular to the soil being worked. It can, for example, be in a plane that rises toward the user, which will have a tendency to cause the cutting tool 7 to advance without any effort. If it is in a plane that rises while moving away from the user, the cutting tool 7 will have a tendency naturally to come closer to the user.

Figure 8:
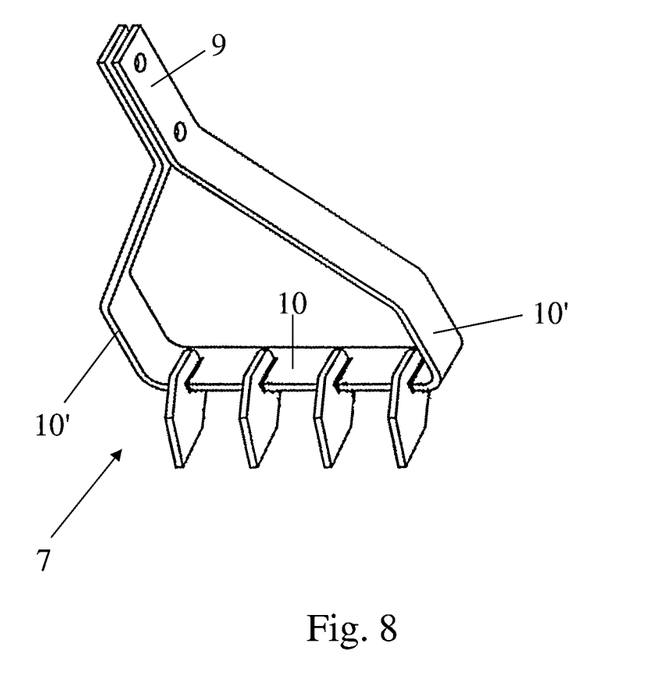

In an advantageous way and at least in connection with forms of tool 7 shown in FIGS. 2, 5 and 8, the angular middle position of the tool 7 is selected so as to result in a positioning that is approximately at a right angle in relation to the surface of the soil being worked, the device 1 then requiring minimum effort for its handling and advancing even all alone in the targeted direction without stressing the user.

As a function of the work to be performed, the nature of the soil and the method of use (vertical/horizontal) of the device 1 by the user, the work tool 7 can exhibit different forms.

In connection with FIGS. 1, 2 and 4 to 8, and according to a very advantageous practical variant embodiment of the invention, the work tool 7 exhibits a general closed loop shape, equipped with a bracket 9 for fastening to the shaft 8.

More particularly, the tool 7 can be made of a single band of material, preferentially metal, whose ends are joined to form the fastening bracket 9, this bracket being centered or not in relation to the tool 7.

According to a preferred design characteristic, the work tool 7 has a closed loop shape, with an approximately rectangular general shape, of which a first portion 10, which is approximately flat and parallel to the soil during use of the device 1, is sharp and equipped with teeth, preferentially at its two opposite sides, and of which two second portions 10', which extend on both sides of the first portion 10 and which extend into a plane that is approximately perpendicular to the soil during use, are sharp.

Such a work tool 7 used on a device 1 according to the invention can perform several functions simultaneously, namely:
  a breaking up, an aeration, and a turning-over of the ground;
  a weeding in depth (severing of the roots by the teeth);
  a leveling and a raking of the worked ground;
  a neat lateral severing (edge-cutting function).

Furthermore, the small-scale reciprocating movements of the tool 7, associated with a large radius circular movement at the level of the active parts of this tool, prevent the generation of jerking at the level of the handle 2. The slight vibrations generated can optionally be absorbed at the handles 2' and 2".

Also, the loop formed by the body of the tool 7 will exhibit sufficient height to allow the passage of the weed without jamming in the loop and a width suited to the nature of the tool 7 and to the power of the actuator 5.

In conformity with another variant for using the device 2 according to the invention, which is evident from FIG. 3 of the accompanying drawings, the work tool can also be attached to the projecting part 8' of the drive shaft 8 by a connecting part 11' that has a connection site provided with an inner notching or a toothing and that is able to engage axially with meshing on a complementary notching or a toothing 8" present on the projecting part 8', the attachment being locked by screws or the like.

The connecting part 11' can, for example, incorporate an open ring with inner notching, in line with the part 12 of the part 11 (see FIGS. 5 to 7), to engage on the part 8' and the shaft 8, and to be locked during mounting by one or more screws 13.

The connecting part 11' can, as a variant, also consist of a part for locking in position and for locking the tool 7 on the shaft 8, the tool 7 then comprising a notching or an inner shape that cooperates with the part 8'.

Figure 9A:
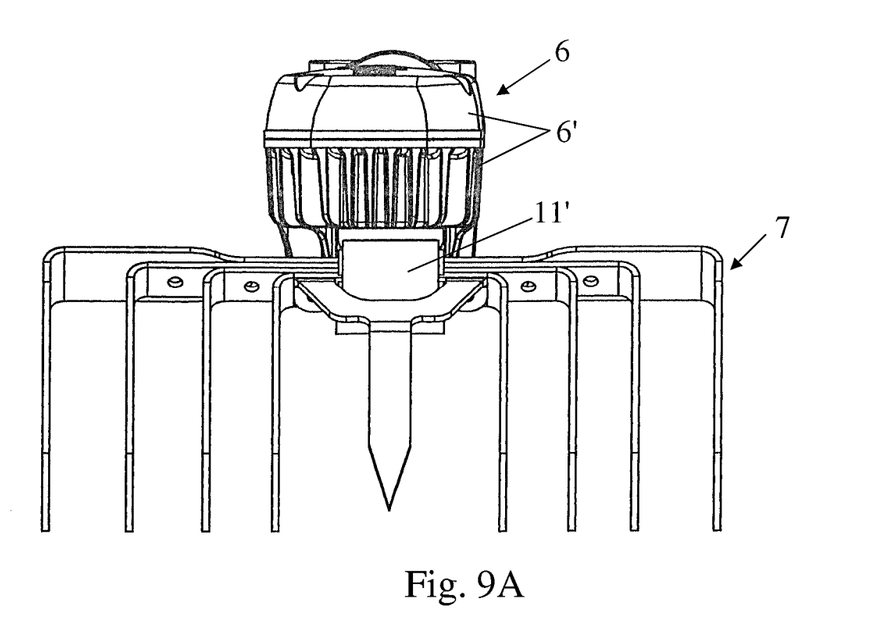
FIGS. 9A and 9B are front elevation and perspective views on a different scale of an assembly [head/connecting part/tool] that is part of the work tool shown in FIG. 3.
Figure 9B:
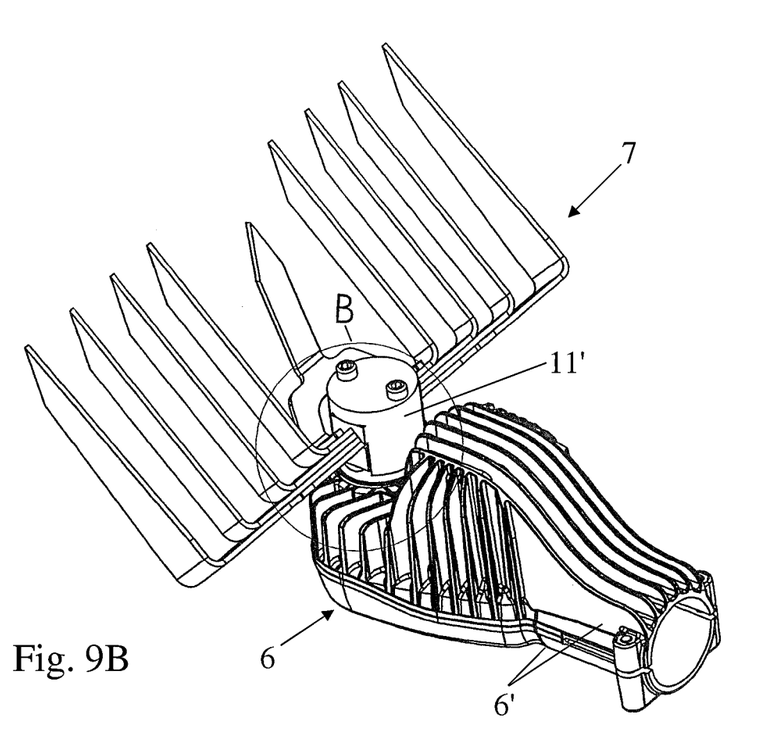
Figure 9C:
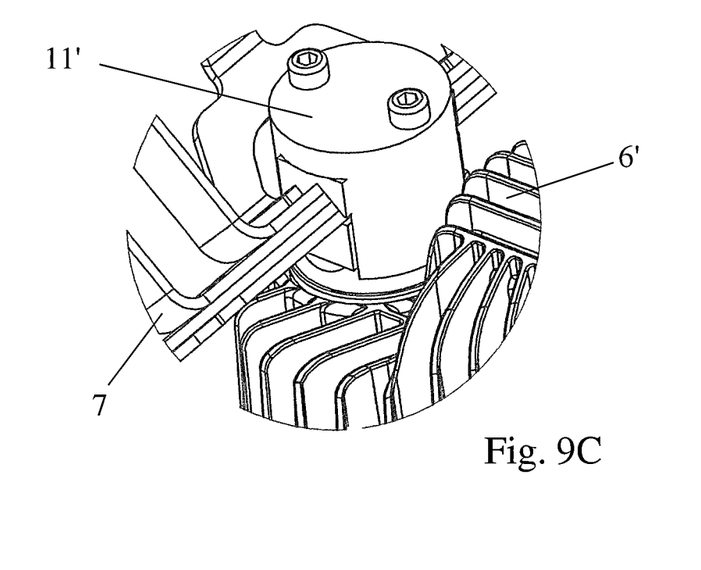
FIG. 9C is a view on a different scale of the detail B of FIG. 9B.

As FIGS. 3, 9A and 9B show by way of example, the work tool 7 can consist of a claw or a fork with multiple teeth oscillating around the axis of the drive shaft 8, positioned vertically during the use of said device 1, said tool 7 being able to exhibit a non-perpendicular arrangement in relation to the longitudinal axis of the handle 2 in middle angular position, according to the adjustment of the latter (the user can then move parallel and at a distance from the strip of soil or ground that is being worked by the tool 7).

To limit to the maximum the shocks for the user during work being done with the device 1, the tool 7 oscillates at a frequency of between 10 and 25 Hz, preferentially at about 15 Hz.

Of course, the invention is not limited to the embodiments described and shown in the accompanying drawings. Modifications remain possible, particularly from the standpoint of the make-up of the various elements or by substitution of technical equivalents, without thereby going outside the field of protection of the invention.

The invention claimed is:

1. A handheld motor-driven soil and ground cultivation device (1), comprising:
    a handle (2) that comprises,
        at a first end (3), a gripping zone and/or at least one gripping element suitable for a user, and,
        at an opposite second end (4), a head (6) comprising a housing and a drive device (5) with a drive shaft (8),
    wherein a work tool (7) is rigidly attached, by a single fastening point, to the head (6) at the drive shaft (8) of the drive device (5) to rotate about an axis of rotation of the drive shaft (8) such that, when the device (1) is used, the work tool (7) is driven with a reciprocating oscillating rotational movement transmitted by the drive device (5) along a portion of rotation and around a specified middle angular position under the action of the reciprocating oscillating rotational movement,
    wherein the work tool (7) is connected removably to the drive shaft (8) of the drive device (5), and is configured to be driven by the reciprocating oscillating rotational movement to oscillate along a vertical or horizontal axis of oscillation of the work tool (7),
    wherein the middle angular position of said work tool (7) with respect to the drive shaft (8) is adjustable,
    wherein the drive device (5) comprises one of an electric actuator or a heat engine,
    wherein the work tool (7) is mounted laterally, or on one side of, said head (6),
    wherein the work tool (7) is mounted on a projecting part (8') of the drive shaft (8), said projecting part (8') projecting outside of the housing of the head (6), and
    wherein the work tool (7) is mounted to the projecting part (8') by means of an intermediate part (11) that is directly and rigidly attached at a first end to the drive shaft (8) and directly attached at an opposite second end to the work tool (7).

2. The device according to claim 1, wherein the work tool (7) is positioned in a symmetrical way in relation to a longitudinal axis (X) of the handle (2), after mounting and fastening on the head (6).

3. The device according to claim 1, wherein the head (6) is attached to the handle (2) by a fastening means that allows a mounting with locking in position of said head (6) in at least two angular positions that are mutually offset around a longitudinal axis (X) of said handle (2).

4. The device according to claim 1, wherein the drive device is incorporated into the head (6).

5. The device according to claim 1, wherein the drive device (5) is an electric actuator of the rotating motor type, having a reduction gear and a system (5') for transmitting and converting movement so as to drive the drive shaft (8) in a reciprocating oscillating rotational movement.

6. The device according to claim 1, wherein the drive device is an electric motor (5), a continuous rotational movement thereof directly converted, by a system (5') for converting movement of the drive shaft (8), into the reciprocating oscillating rotational movement.

7. The device according to claim 1, wherein the drive device (5) is an electric actuator that is supplied by an independent power source (1') configured to be carried by the user and which is part of the handheld motor-driven device (1).

8. The device according to claim 1, wherein the work tool (7) is attached, with several middle angular positions, to the projecting part (8') of the drive shaft (8), and is configured to be fastened in an indexed position, located within a range of angular positions, around the drive shaft (8) and defining the middle angular position.

9. The device according to claim 8, wherein a range of the angular positions comprises corresponding indexed positions, such that for a given inclination of the handle (2) in relation to the ground, at the middle angular positions, the work tool (7) exhibits a movement of advance or of independent and automatic progress, associated with an inversely proportional penetration of the work tool (7) into the soil.

10. The device according to claim 1, wherein the work tool (7) comprises a single fastening bracket (9) configured to be rigidly attached to the intermediate part (11).

11. The device according to claim 1, wherein the body of the intermediate part (11) comprises two parts (12, 12') comprising a first U-shaped part (12) incorporating an open ring with inner notching or toothing to engage with a complementary notching or a toothing (8") present on the projecting part (8') of the drive shaft (8), and a second part (12') forming a fastening plate for the bracket (9) of the work tool (7).

12. The device according to claim 11,
    wherein the intermediate part (11) is secured to the projecting part (8') of the drive shaft (8) by a fastener (13) extending through the branches of the U extending the open ring of the first part (12) and engaging in a circular groove (14) on the projecting part (8') of the drive shaft (8), and
    wherein the second part (12') forming a plate exhibits an indentation (12") to receive the bracket (9) of the work tool (7) in a clamped way, the engagement with fitting of said bracket (9) in said indentation (12") being locked.

13. The device according to claim 1,
    wherein the projecting part (8') of the drive shaft (8) is equipped with a plate or with a dial (15) comprising an angular graduation (16), and
    wherein the intermediate part (11) or the work tool (7) is provided with an indexing mark (17), located face-to-face with said angular graduation (16) in a mounted position of said intermediate part (11), with or without the tool (7).

14. The device according to claim 1, wherein the middle angular position of the work tool (7) is adjustable in such a way that in a position of use, said tool (7) makes an approximately symmetrical pendular movement around the vertical in relation to the soil.

15. The device according to claim 1, wherein the work tool (7) has a closed loop shape, equipped with a bracket (9) for fastening to the drive shaft (8).

16. The device according to claim 15, wherein the work tool (7) is made of a single band of material, whose ends are joined to form the fastening bracket (9).

17. The device according to claim 15, wherein the work tool (7) has a closed loop shape, with an approximately rectangular general shape, of which a first portion (10), which is approximately flat and parallel to the soil during use of the device (1), is sharp and equipped with teeth, and of which two second portions (10'), which extend on both sides of the first portion (10) and which extend into a plane that is approximately perpendicular to the soil during use, are sharp.

18. The device according to claim 1, wherein the first end (3) of the handle (2) is provided with a portion (2') that incorporates an electronic card for control of the electric actuator (5), connected to elements for control and selection of speeds.

19. The device according to claim 7, wherein the independent power source (1') is comprised of a rechargeable electric battery of the Li-Ion or Li-Polymer type.

20. The device according to claim 1, wherein the work tool (7) oscillates at a frequency of between 10 and 25 Hz.

21. The device according to claim 19, wherein the independent power source (1') is configured to be carried by the user by means of a harness.

22. A handheld motor-driven soil and ground cultivation device (1), comprising:
a handle (2) that comprises,
at a first end (3), a gripping zone and/or at least one gripping element suitable for a user, and,
at an opposite second end (4), a head (6) comprising a housing and a drive device (5) with a drive shaft (8),
wherein a work tool (7) is rigidly attached, by a single fastening point, to the head (6) at the drive shaft (8) of the drive device (5) to rotate about an axis of rotation of the drive shaft (8) such that, when the device (1) is used, the work tool (7) is driven with a reciprocating oscillating rotational movement transmitted by the drive device (5) along a portion of rotation and around a specified middle angular position under the action of the reciprocating oscillating rotational movement,
wherein the work tool (7) is connected removably to the drive shaft (8) of the drive device (5), and is configured to be driven by the reciprocating oscillating rotational movement oscillate along a vertical or horizontal axis of oscillation of the work tool (7),
wherein the middle angular position of said work tool (7) with respect to the drive shaft (8) is adjustable,
wherein the drive device (5) comprises one of an electric actuator or a heat engine,
wherein the work tool (7) is mounted laterally, or on one side of, said head (6), and
wherein the work tool (7) is positioned in a symmetrical way in relation to the longitudinal axis (X) of the handle (2), after mounting and fastening on the head (6).

23. A handheld motor-driven soil and ground cultivation device (1), comprising:
a handle (2) that comprises,
at a first end (3), a gripping zone and/or at least one gripping element suitable for a user, and,
at an opposite second end (4), a head (6) comprising a housing and a drive device (5) with a drive shaft (8),
wherein a work tool (7) is rigidly attached, by a single fastening point, to the head (6) at the drive shaft (8) of the drive device (5) to rotate about an axis of rotation of the drive shaft (8) such that, when the device (1) is used, the work tool (7) is driven with a reciprocating oscillating rotational movement transmitted by the drive device (5) along a portion of rotation and around a specified middle angular position under the action of the reciprocating oscillating rotational movement,
wherein the work tool (7) is connected removably to the drive shaft (8) of the drive device (5), and is configured to be driven by the reciprocating oscillating rotational movement oscillate along a vertical or horizontal axis of oscillation of the work tool (7),
wherein the middle angular position of said work tool (7) with respect to the drive shaft (8) is adjustable,
wherein the drive device (5) comprises one of an electric actuator or a heat engine,
wherein the work tool (7) is mounted laterally, or on one side of, said head (6),
wherein the work tool (7) is mounted on a projecting part (8') of the drive shaft (8), said projecting part (8') projecting outside of the housing of the head (6), and
wherein the drive device is an electric motor (5), a continuous rotational movement thereof directly converted, by a system (5') for converting movement of the drive shaft (8), into the reciprocating oscillating rotational movement.

24. A handheld motor-driven soil and ground cultivation device (1), comprising:
a handle (2) that comprises,
at a first end (3), a gripping zone and/or at least one gripping element suitable for a user, and,
at an opposite second end (4), a head (6) comprising a housing and a drive device (5) with a drive shaft (8),
wherein a work tool (7) is rigidly attached, by a single fastening point, to the head (6) at the drive shaft (8) of the drive device (5) to rotate about an axis of rotation of the drive shaft (8) such that, when the device (1) is used, the work tool (7) is driven with a reciprocating oscillating rotational movement transmitted by the drive device (5) along a portion of rotation and around a specified middle angular position under the action of the reciprocating oscillating rotational movement,
wherein the work tool (7) is connected removably to the drive shaft (8) of the drive device (5), and is configured to be driven by the reciprocating oscillating rotational movement oscillate along a vertical or horizontal axis of oscillation of the work tool (7),
wherein the middle angular position of said work tool (7) with respect to the drive shaft (8) is adjustable,
wherein the drive device (5) comprises one of an electric actuator or a heat engine,
wherein the work tool (7) is mounted laterally, or on one side of, said head (6),
wherein the work tool (7) is attached to a projecting part (8') of the drive shaft (8) by a connecting part (11') of the work tool (7) that has a connection site provided with an inner notching or a toothing and configured to engage axially with meshing on a complementary notching or a toothing (8") present on the projecting part (8'), the connecting part (11') being locked to the projecting part (8') by fasteners.

25. The device according to claim 24, wherein the work tool (7) is comprised of a claw or a fork with multiple teeth configured to oscillate around the axis of the drive shaft (8), positioned vertically during the use of said device (1), said tool (7) being configured to exhibit a non-perpendicular arrangement in relation to a longitudinal axis of the handle (2) in a middle angular position, according to the adjustment of the handle (2).

* * * * *